United States Patent
Konashi

(10) Patent No.: US 12,254,018 B2
(45) Date of Patent: Mar. 18, 2025

(54) TIME-SERIES DATA PROCESSING METHOD, TIME-SERIES DATA PROCESSING DEVICE, TIME-SERIES DATA PROCESSING SYSTEM, AND RECORDING MEDIUM

(71) Applicant: NEC Corporation, Tokyo (JP)

(72) Inventor: Takashi Konashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 155 days.

(21) Appl. No.: 18/013,405

(22) PCT Filed: Jul. 3, 2020

(86) PCT No.: PCT/JP2020/026287
§ 371 (c)(1),
(2) Date: Dec. 28, 2022

(87) PCT Pub. No.: WO2022/003983
PCT Pub. Date: Jan. 6, 2022

(65) Prior Publication Data
US 2023/0252038 A1 Aug. 10, 2023

(51) Int. Cl.
*G06F 7/00* (2006.01)
*G06F 16/2458* (2019.01)
(Continued)

(52) U.S. Cl.
CPC ........ *G06F 16/2477* (2019.01); *G06F 16/248* (2019.01); *G06F 16/284* (2019.01)

(58) Field of Classification Search
CPC .. G06F 16/2477; G06F 16/284; G06F 16/248; G06F 2218/08; G06F 2218/12;
(Continued)

(56) References Cited

U.S. PATENT DOCUMENTS

2015/0205693 A1* 7/2015 Seto .................... G06F 11/3065
702/186
2020/0096566 A1* 3/2020 Naohara ............ G01R 31/2831
(Continued)

FOREIGN PATENT DOCUMENTS

JP 2012-513645 A 6/2012
JP 2014-112280 A 6/2014
(Continued)

OTHER PUBLICATIONS

International Search Report for PCT Application No. PCT/JP2020/026287, mailed on Oct. 6, 2020.

*Primary Examiner* — Md I Uddin

(57) ABSTRACT

A time-series data processing system 100 according to the present invention includes a comparison unit 121 configured to compare a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data, and a detection unit 122 configured to detect a specific state in the second time-series data based on a result of the comparison.

11 Claims, 13 Drawing Sheets

(51) Int. Cl.
*G06F 16/248* (2019.01)
*G06F 16/28* (2019.01)

(58) Field of Classification Search
CPC .......... G06F 17/18; G06F 17/40; G06F 18/22; G06F 18/2433; G06F 16/2474; G06V 2201/06; G05B 23/0224; G06N 20/00
USPC ....... 707/692, 722, 736, 758, 693, 737, 748, 707/776, 821, E17.01, E17.089; 702/32, 702/179, 182, 183, 189, 190
See application file for complete search history.

(56) References Cited

U.S. PATENT DOCUMENTS

| | | | |
|---|---|---|---|
| 2021/0182797 A1* | 6/2021 | Park | G06Q 10/109 |
| 2022/0234164 A1* | 7/2022 | Torikoshi | H01L 21/304 |

FOREIGN PATENT DOCUMENTS

| | | |
|---|---|---|
| JP | 2018-205994 A | 12/2018 |
| WO | 2020/049666 A1 | 3/2020 |

* cited by examiner

Fig.8

| RANK | TIME | SIMILARLY SCORE | SIMILARLY MAP |
|---|---|---|---|
| 1 | MAY 3, 10:50 | 0.9 | |
| 2 | FEBRUARY 24, 18:10 | 0.75 | |
| 3 | OCTOBER 15, 13:40 | 0.70 | |
| 4 | MARCH 7, 6:20 | 0.65 | |

TIME-SERIES DATA PROCESSING METHOD, TIME-SERIES DATA PROCESSING DEVICE, TIME-SERIES DATA PROCESSING SYSTEM, AND RECORDING MEDIUM

This application is a National Stage Entry of PCT/JP2020/026287 filed on Jul. 3, 2020, the contents of all of which are incorporated herein by reference, in their entirety.

TECHNICAL FIELD

The present invention relates to a time-series data processing method, a time-series data processing device, a time-series data processing system, and a recording medium.

BACKGROUND ART

There are industrial plants that manufacture energy (electricity, gas, clean water, and the like), petrochemical products (crude oil, gasoline, plastic, and the like), food products, pharmaceutical products, and the like, and chemical plants such as plant facilities and apparatuses that produce chemical products. In these plants, and equipment/large-scale machinery such as information processing systems, time-series data, which is measurement values from various kinds of sensors, is analyzed, and occurrence of an abnormal state is detected and output. For example, Patent Literature 1 is configured to detect an abnormality from time-series data using feature amounts of a plurality of feature waveforms.
Patent Literature 1: JP 2018-205994 A

SUMMARY

Then, when the detection of the abnormality in the time-series data is attempted using the feature waveforms as described above, the length of the duration of each of the feature waveforms, i.e., the length of the period of partial time-series data for extracting the feature amount assumes importance. For example, if the period has a long duration, this makes it difficult to prepare learning data covering features of various types of partial time-series data desired to be detected. On the other hand, if the period has a short duration, this involves a problem of a reduction in a variation in the feature of the partial time-series data, thereby undesirably leading to detection of matches with a large number of pieces of partial time-series data and ending up an increase in false detection. As a result, a problem arises in that it is difficult to appropriately detect a specific situation such as an abnormality from the time-series data.

In light thereof, an object of the present invention is to provide a time-series data processing method capable of solving the above-described problem, i.e., the difficulty in the appropriate detection of the specific situation from the time-series data.

A time-series data processing method, according to one aspect of the present invention, is configured to include
comparing a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data, and
detecting a specific state in the second time-series data based on a result of the comparing.

Further, a time-series data processing device, according to one aspect of the present invention, is configured to include
a comparison unit configured to compare a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data, and
a detection unit configured to detect a specific state in the second time-series data based on a result of the comparison.

Further, a program, according to one aspect of the present invention, is configured to cause an information processing device to realize
a comparison unit configured to compare a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data, and
a detection unit configured to detect a specific state in the second time-series data based on a result of the comparison.

By being configured in the above-described manner, the present invention allows the specific situation to be appropriately detected from the time-series data.

BRIEF DESCRIPTION OF DRAWINGS

FIG. 8 illustrates how the time-series data is processed by the time-series data processing device disclosed in FIG. 1.

EXEMPLARY EMBODIMENTS

First Exemplary Embodiment

Figure 1:
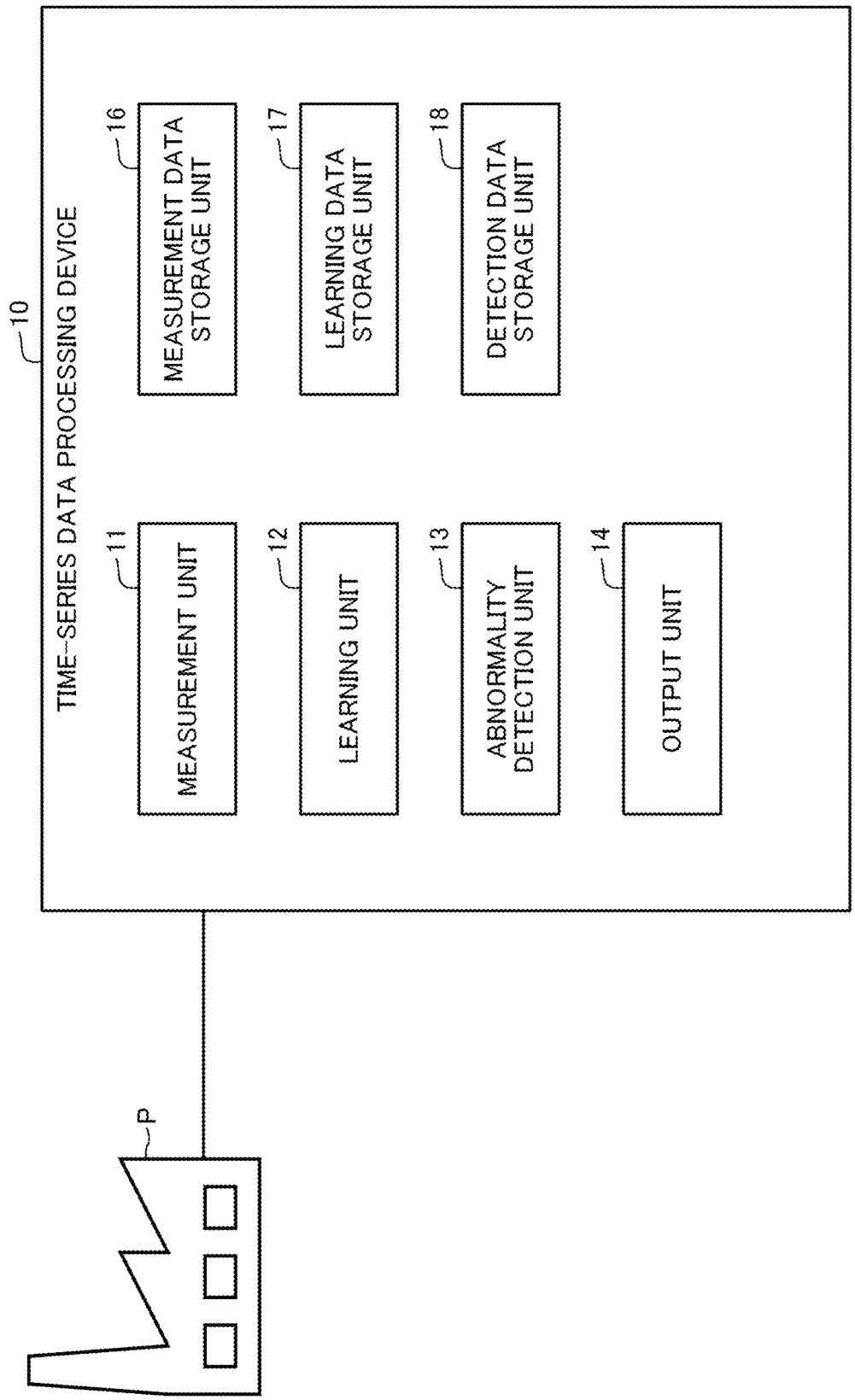
FIG. 1 is a block diagram illustrating a configuration of a time-series data processing device according to a first exemplary embodiment of the present invention.

A first exemplary embodiment of the present invention will be described with reference to FIGS. 1 to 10. FIG. 1 is a diagram for illustrating a configuration of a time-series data processing device, and FIGS. 2 to 10 are drawings for illustrating a processing operation of the time-series data processing device.

[Configuration]

A time-series data processing device 10 according to the present invention is connected to a monitoring object P such as a plant. Then, the time-series data processing device 10 acquires and analyzes measurement values of at least one or more data items of the monitoring object P, and monitors the state of the monitoring object P based on a result of the analysis. For example, the monitoring object P is a plant such as a manufacturing plant or a processing facility, and the measurement values of the data items include a plurality of kinds of data item values such as a temperature in the plant, a pressure, a flow rate, a power consumption value, and a supply amount and a remaining amount of a material. Then, in the present exemplary embodiment, the monitored state of the monitoring object P is set to a state of the monitoring object P that is determined to be abnormal in advance, and the monitoring object P is detected to be in the abnormal state based on feature amounts of the measurement values of the data items. However, the monitored state of the monitoring object P is not necessarily limited to the abnormal state, and may be a preset specific state even if this state is not abnormal. The preset specific state that is not abnormal is, for example, a predictive sign of an abnormality.

Note that the monitoring object P in the present invention is not limited to the plant, and may be anything including equipment such as an information processing system. For example, in the case where the monitoring object P is the information processing system, the time-series data processing device 10 may monitor the state of the information processing system by measuring CPU (Central Processing Unit) utilization, memory utilization, disk access frequency, the number of input/output packets, an input/output packet rate, a power consumption value, and the like of each information processing device such as a terminal and a server constituting the information processing system as the measurement values of the data items, and analyzing these measurement values.

The above-described time-series data processing device 10 is configured of one or a plurality of information processing device(s) each including an arithmetic unit and a storage unit. Then, as illustrated in FIG. 1, the time-series data processing device 10 includes a measurement unit 11, a learning unit 12, an abnormality detection unit 13, and an output unit 14. The functions of the measurement unit 11, the learning unit 12, the abnormality detection unit 13, and the output unit 14 can be realized through execution of a program for realizing the functions that is stored in the storage unit by the arithmetic unit. Further, the time-series data processing device 10 includes a measurement data storage unit 16, a learning data storage unit 17, and a detection data storage unit 18. The measurement data storage unit 16, the learning data storage unit 17, and the detection data storage unit 18 are configured of the storage unit. Hereinafter, each configuration will be described in detail.

Figure 2:
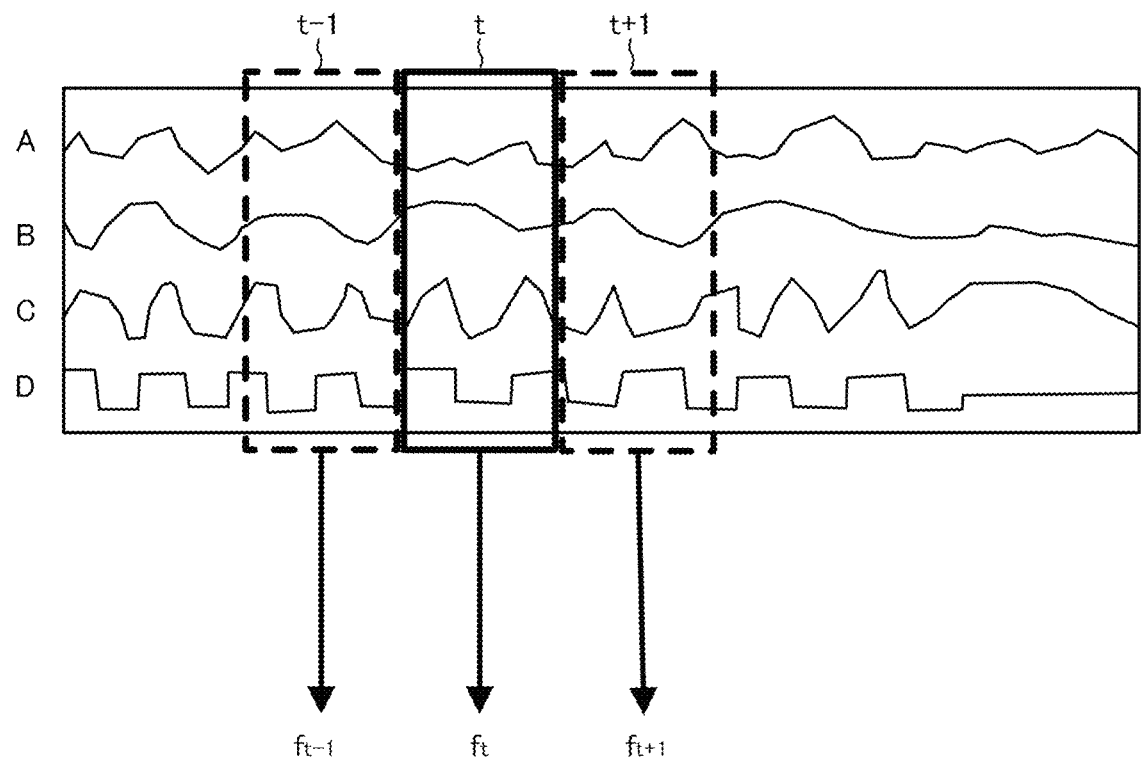
FIG. 2 illustrates how time-series data is processed by the time-series data processing device disclosed in FIG. 1.

The measurement unit 11 acquires the measurement values of elements that are measured by various kinds of sensors set up in the monitoring object P at predetermined time intervals as time-series data, and stores them into the measurement data storage unit 16. Because there is a plurality of kinds of elements measured at this time, the measurement unit 11 acquires a time-series data set that is a group of pieces of time-series data A, B, C, and D with respect to the plurality of elements as illustrated in FIG. 2. For example, the measurement unit 11 acquires the measurement values of the elements at one-minute intervals and records them as the time-series data in the present exemplary embodiment, but may acquire the measurement values of the elements at any time interval. Note that the measurement unit 11 acquires and stores the time-series data set constantly or per predetermined time, and the acquired time-series data set is, for example, a learning time-series data set (first time-series data), which is used to generate a model indicating the abnormal state of the monitoring object P, and an abnormality detection time-series data set (second time-series data), which is used when the state of the monitoring object P is monitored, as will be described below. However, the time-series data acquired by the measurement unit 11 is not necessarily limited to the data configured of the measurement values of the plurality of elements, and may be the measurement value of one element.

The learning unit 12 carries out learning based on the learning time-series data set (the first time-series data) that has been measured when the monitoring object P has been determined to be in the abnormal state previously, and information indicating the type of the determined abnormal state, which are stored in the measurement data storage unit 16. Especially, the learning unit 12 calculates the feature amount in the time-series data set at the time of a specific abnormal state, and generates coded data indicating this feature amount as an abnormal state model indicating the specific abnormal state. Then, the learning unit 12 stores the model configured of the generated coded data in the learning data storage unit 17 together with the information indicating the specific abnormal state.

Now, the specific content of the learning processing by the learning unit 12 will be described. The learning unit 12 first inputs the time-series data set measured from the monitoring object P, and extracts a segment set configured of a plurality of segments (a plurality of specific periods) among segments that are periods into which a time-series data set around a time when the specific abnormal state has occurred on a time axis is divided at predetermined time intervals. At this time, the plurality of segments constituting the segment set includes a single segment (a target period) and another one segment or a plurality of other segments (another period/ other periods) having a positional relationship located at a preset specific position relative to this single segment.

As one example thereof, the extraction of the segment set in the case of the time-series data set illustrated in FIG. 2 will be described. In this time-series data set, if the specific abnormal state has occurred at time t, the learning unit 12 first extracts a predetermined period containing time t as the single "target segment" indicated by a frame surrounded by a solid line. Further, the learning unit 12 extracts respective predetermined periods containing other times t−1 and t+1 prior and subsequent to the target segment on the time axis as "neighboring segments" indicated by frames surrounded by dotted lines, respectively. In other words, in the example illustrated in FIG. 2, the neighboring segments are two predetermined periods adjacent to the target segment prior and subsequent thereto on the time axis, respectively. Note that both the target segment and the neighboring segments are periods lasting for equal durations, and are, for example, periods lasting for 10 minutes.

Then, the learning unit 12 calculates the feature amount of partial time-series data included in each of the segments constituting the segment set extracted in the above-described manner. In the example illustrated in FIG. 2, the learning unit 12 calculates a feature amount $f_t$ of the partial time-series data included in the target segment and feature amounts $f_{t-1}$ and $f_{t+1}$ of pieces of partial time-series data respectively included in the two neighboring segments. At this time, the learning unit 12 calculates the feature amount of the partial time-series data in each of the segments based on, for example, the measurement value of each of the elements at the time in the segment in the partial time-series data in each of the segments, and the correlation among the measurement values of the elements. Then, the learning unit 12 stores the feature amount of each of the segments into the learning data storage unit 17 as the abnormal state model in the form of coded data expressed by a binary code such as 0 and 1 in association with the information indicating the specific abnormal state. At this time, the learning unit 12 may also store information indicating the positional relationship among the segments, i.e., the positional relationship of the neighboring segments with the target segment. In the example illustrated in FIG. 2, the learning unit 12 stores positional relationship information indicating that one neighboring segment is adjacently located on each of the prior side and the subsequent side to the target segment constituting the segment set on the time axis. Note that the method for calculating the feature amount of the partial time-series data in each of the segments is not limited to the above-described method, and may be any method. Note that the learning unit 12 has been described above assuming that the learning unit 12 learns the abnormal state of the monitoring object P, but may learn a normal state of the monitoring object P. In this case, the learning unit 12 generates a normal state model regarding the normal state of the monitoring object P based on the pieces of time-series data of the elements when the monitoring object P is in the normal state.

The abnormality detection unit 13 (a comparison unit and a detection unit) reads out the abnormality detection time-series data set (the second time-series data) of the monitoring object P measured by the measurement unit 11 or stored in the measurement data storage unit 16, and detects the specific abnormal state based on this time-series data set. At this time, the abnormality detection unit 13 detects the specific abnormal state by reading out the feature amounts of the above-described target segment and neighboring segments as the abnormal state model stored in the learning data storage unit 17, and comparing these feature amounts and the feature amounts in a set of pieces of partial time-series data in a plurality of some periods in the abnormality detection time-series data set.

Figure 3:
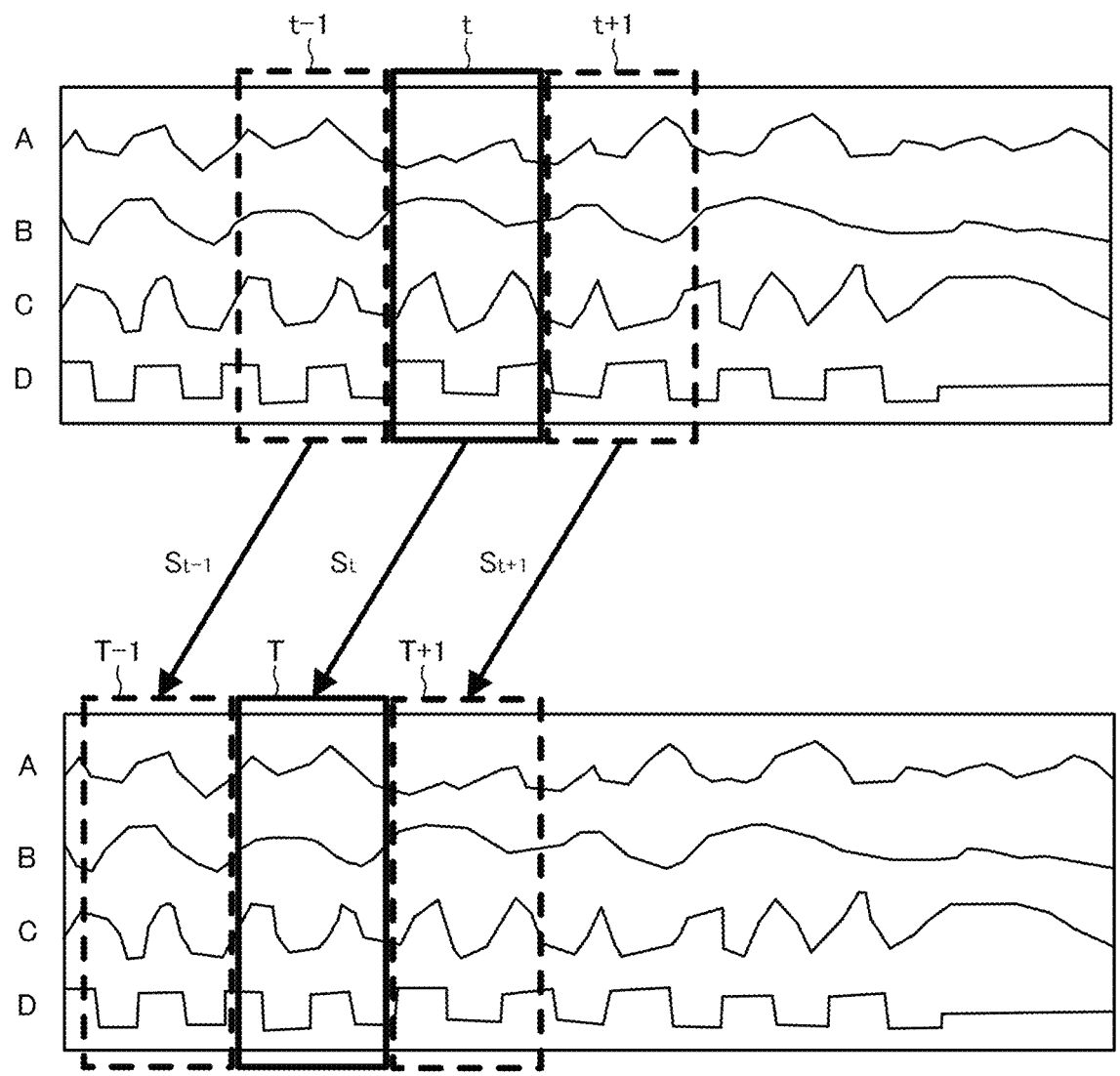
FIG. 3 illustrates how time-series data is processed by the time-series data processing device disclosed in FIG. 1.

More specifically, the abnormality detection unit 13 first extracts a comparison segment set configured of a plurality of segments located in correspondence with the positional relationship on the time axis in the segment set configured of the above-described target segment and neighboring segments from the abnormality detection time-series data set. For example, the abnormality detection unit 13 first extracts a segment that is a period lasting for a duration of 10 minutes at an arbitrary position on the time axis in the abnormality detection time-series data set as a "comparison target segment" corresponding to the above-described target segment. In addition, the abnormality detection unit 13 extracts the segments lasting for a duration of 10 minutes that are adjacently located prior and subsequent to the comparison target segment on the time axis, respectively, as "comparison neighboring segments" corresponding to the above-described neighboring segments. Now, the upper drawing of FIG. 3 illustrates the learning time-series data set, and the lower drawing of FIG. 3 illustrates the abnormality detection time-series data set. As illustrated in these drawings, the abnormality detection unit 13 first extracts a predetermined period containing time T as the "comparison target segment" indicated by a frame surrounded by a solid line and extracts respective predetermined periods containing other times T−1 and T+1 located adjacently prior and subsequent thereto as the "comparison neighboring segments" indicated by frames surrounded by dotted lines, respectively, in the abnormality detection time-series data set, and prepares them as the comparison segment set.

Then, the abnormality detection unit 13 individually calculates the feature amount of the partial time-series data in the comparison segment set in the abnormality detection time-series data set, i.e., in each of the comparison target segment and the comparison neighboring segment set, in a similar manner to the feature amount calculated with respect to the target segment and the neighboring segments in the above-described learning time-series data set. Then, the abnormality detection unit 13 compares the feature amounts of the segments in the learning time-series data set and the feature amounts of the segments in the abnormality detection time-series data set for each of the segments. At this time, the abnormality detection unit 13 compares the feature amounts of segments corresponding to each other in the respective positional relationships on the time axis in the time-series data sets as indicated by arrows in FIG. 3. More specifically, in the example illustrated in FIG. 3, the abnormality detection unit 13 compares the feature amount of the target segment (time t) in the learning time-series data set and the feature amount of the comparison target segment (time T) in the abnormality detection time-series data. Further, the abnormality detection unit 13 compares the feature amount of the neighboring segment (time t−1) located adjacently prior to the target segment in the learning time-series data set on the time axis and the feature amount of the comparison neighboring segment (time T−1) located adjacently prior to the comparison target segment in the abnormality detection time-series data. Further, the abnormality detection unit 13 compares the feature amount of the neighboring segment (time t+1) located adjacently subsequent to the target segment in the learning time-series data set on the time axis and the feature amount of the comparison neighboring segment (time T+1) located adjacently subsequent to the comparison target segment in the abnormality detection time-series data.

At this time, the abnormality detection unit 13 calculates a similarity between the feature amounts when comparing the feature amounts between the segments as described above. As one example, in a case where the feature amounts are expressed as the coded data such as binary vectors, the abnormality detection unit 13 calculates the distance between the binary vectors, thereby calculating the similarity between the feature amounts based on this distance. Now, assume that, in the example illustrated in FIG. 3, a similarity $S_t$ is calculated with respect to the target segment, and similarities $S_{t-1}$ and $S_{t+1}$ are calculated with respect to the two neighboring segments, respectively.

Further, the abnormality detection unit 13 detects whether the abnormal state corresponding to the specific state has occurred in the abnormality detection time-series data set based on the results of the comparisons between the feature amounts made with respect to the segments in the above-described manner, i.e., based on the similarities $S_t$, $S_{t-1}$, and $S_{t+1}$ calculated with respect to the segments. For example, the abnormality detection unit 13 calculates a score acquired by tallying all of the calculated similarities $S_t$, $S_{t-1}$, and $S_{t+1}$ according to a preset tallying method, and detects the abnormal state based on the score that is the result of this tallying. As one example, the abnormality detection unit 13 calculates the average value of the similarities by summing up all of the similarities $S_t$, $S_{t-1}$, and $S_{t+1}$ and dividing the sum by the number of segments, thereby calculating the score that is the result of the tallying. At this time, the abnormality detection unit 13 directly adds the similarity $S_t$ with respect to the target segment while adding the similarities $S_{t-1}$ and $S_{t+1}$ with respect to the neighboring segments after applying lower weights w thereto, and then calculates the average value and acquires the result as the score. For example, in the example illustrated in FIG. 3, suppose that the target segment is assigned with w(t)=1.0 when the similarity thereof is $S_t$=0.9, and the neighboring segments are assigned with weights w(t−1)=w(t+1)=0.9, respectively, when the similarities thereof are $S_{t-1}$=0.85 and $S_{t+1}$=0.70, respectively. Then, assuming that the number of segments is n, the score can be calculated as "the score=ΣS (t)*w(t)/n", thereby being calculated as "(0.9*1.0+ 0.85*0.9+0.70*0.9)/3".

Note that the value of the weight applied to the similarity of the neighboring segment in the above-described manner may be set according to the position of the neighboring segment relative to the target segment. For example, the value of the weight applied to the similarity of the neighboring segment may be set according to whether the position of the neighboring segment is located prior to the target segment on the time axis or located subsequent to the target segment on the time axis, and may be set according to the distance from the target segment to the neighboring segment in a case where the neighboring segment is not located adjacently to the target segment as will be described below. As one example, the value of the weight applied to the similarity of the neighboring segment may be set to a lower value as the distance from the target segment to the neighboring segment increases.

Figure 4:
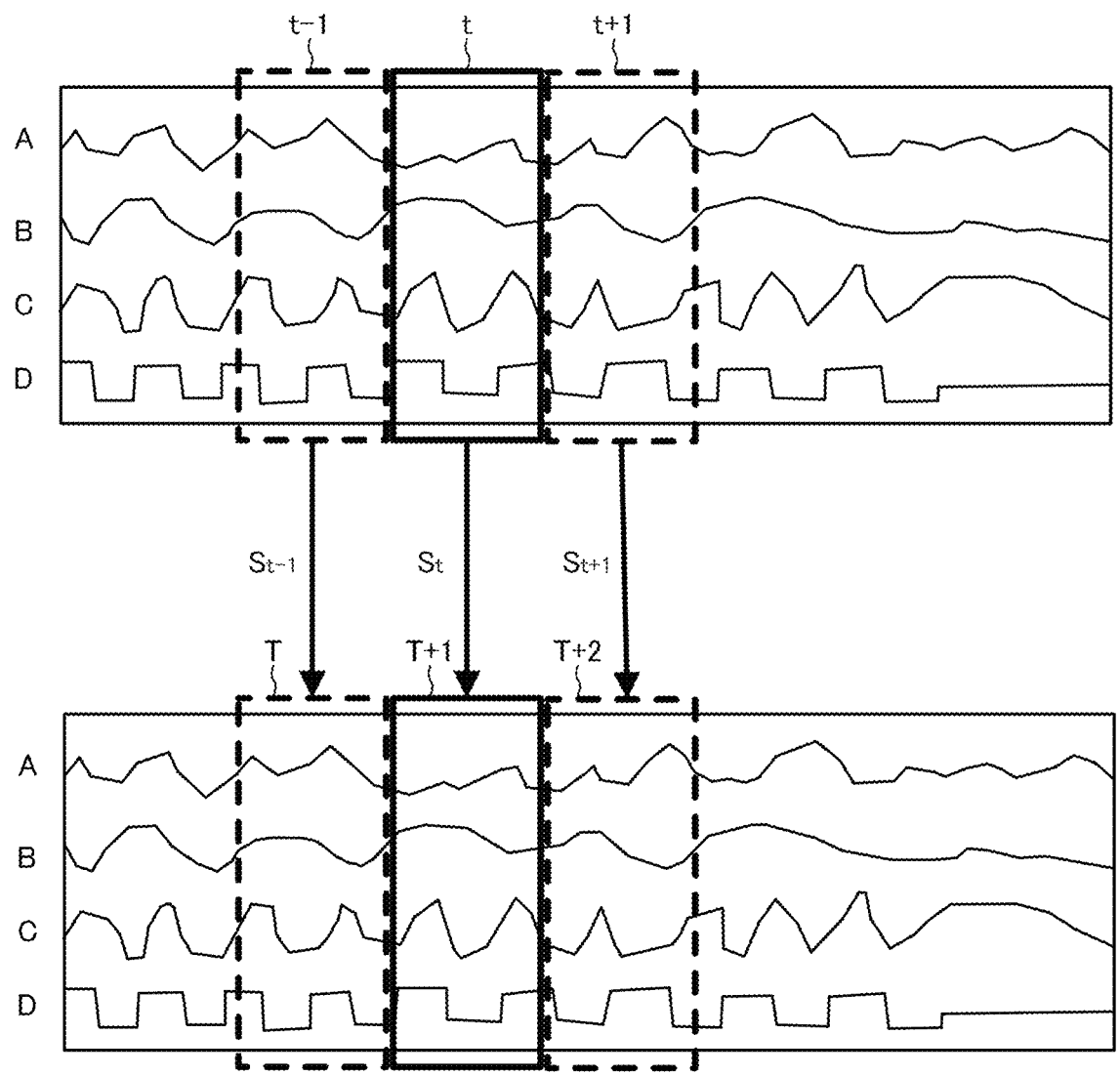
FIG. 4 illustrates how the time-series data is processed by the time-series data processing device disclosed in FIG. 1.
Figure 5:
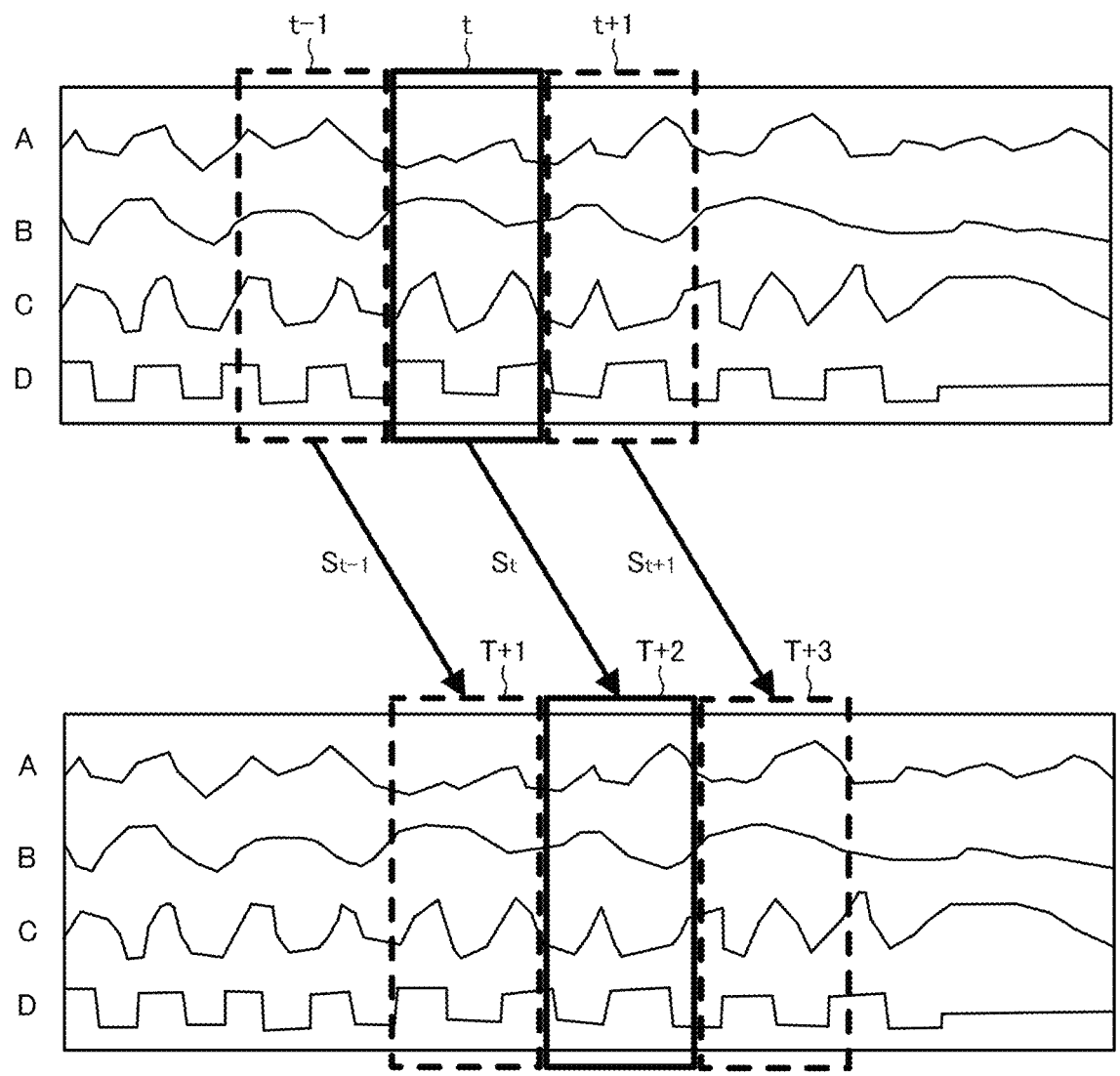
FIG. 5 illustrates how the time-series data is processed by the time-series data processing device disclosed in FIG. 1.

Then, the abnormality detection unit 13 repeats the above-described abnormality detection processing after changing the position of the comparison segment set in the abnormality detection time-series data set. For example, the abnormality detection unit 13 first calculates the score with respect to the comparison segment set illustrated in FIG. 3, and, after that, calculates a score with respect to a comparison segment set at a different position on the time axis while focusing on the segment located at time T+1 as the comparison target segment and segments located adjacently prior and subsequent thereto as the comparison neighboring segments as illustrated in FIG. 4. After that, the abnormality detection portion 13 further calculates a score with respect to a comparison segment set at a different position on the time axis while focusing on a segment located at time T+2 as the comparison target segment and segments located adjacently prior and subsequent thereto as the comparison neighboring segments as illustrated in FIG. 5. In this manner, the abnormality detection unit 13 extracts the comparison segment sets at a plurality of positions on the time axis in the abnormality detection time-series data set, and compares them with the abnormal state model and calculates the scores thereof.

Then, the abnormality detection unit 13 detects whether the abnormality has occurred in the abnormality detection time-series data set based on the scores with respect to the plurality of comparison segment sets calculated in the above-described manner. For example, the abnormality detection unit 13 detects that the abnormal state has occurred if the score is equal to or higher than a preset threshold value. However, the abnormality detection unit 13 may detect the abnormality using any method based on the value of the score.

Note that the segment set extracted in the learning time-series data set has been described above citing the example in which the extracted segment set is configured of the single target segment and the two neighboring segments located adjacently prior and subsequent to this target segment on the time axis, respectively, but the number of neighboring segments and the positions thereof are not limited to the above-described example. In other words, the neighboring segments may include any number of segments, and, further, may be located in any positional relationship with the target segment. According thereto, the comparison segment set extracted in the abnormality detection time-series data set is supposed to be also extracted in correspondence with the positional relationship between the target segment and the neighboring segment in the segment set. It is effective that the neighboring segment constituting the segment set is located within a preset range from the target segment on the time axis at this time. In other words, it is effective that the neighboring segment is extracted in a range that is not too distant from the target segment on the time axis and is preset as a time close to the time of the target segment.

Figure 6:
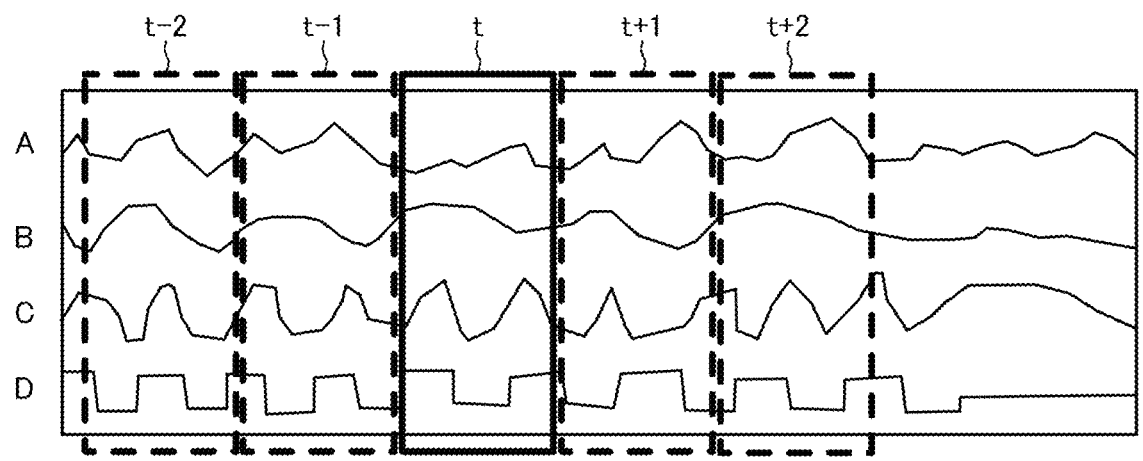
FIG. 6 illustrates how the time-series data is processed by the time-series data processing device disclosed in FIG. 1.
Figure 6:
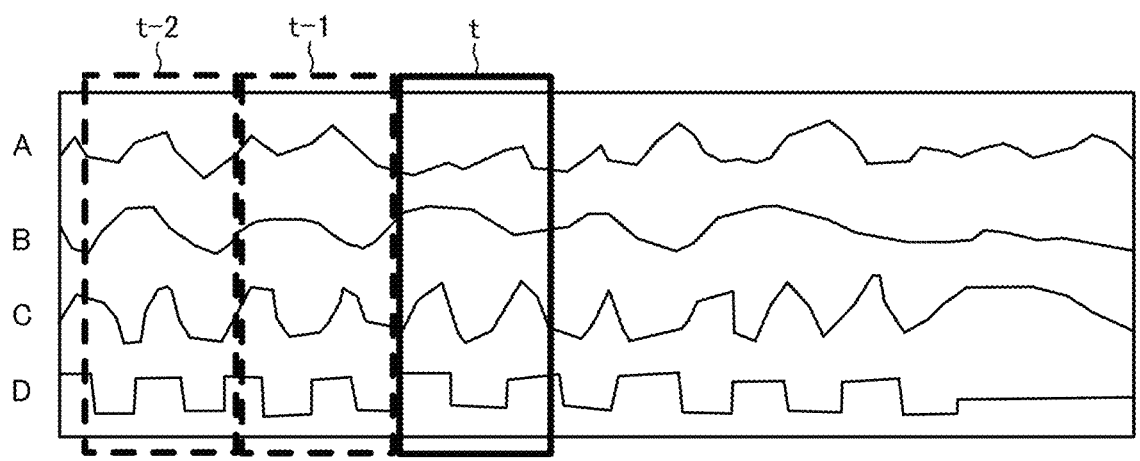
Figure 7:
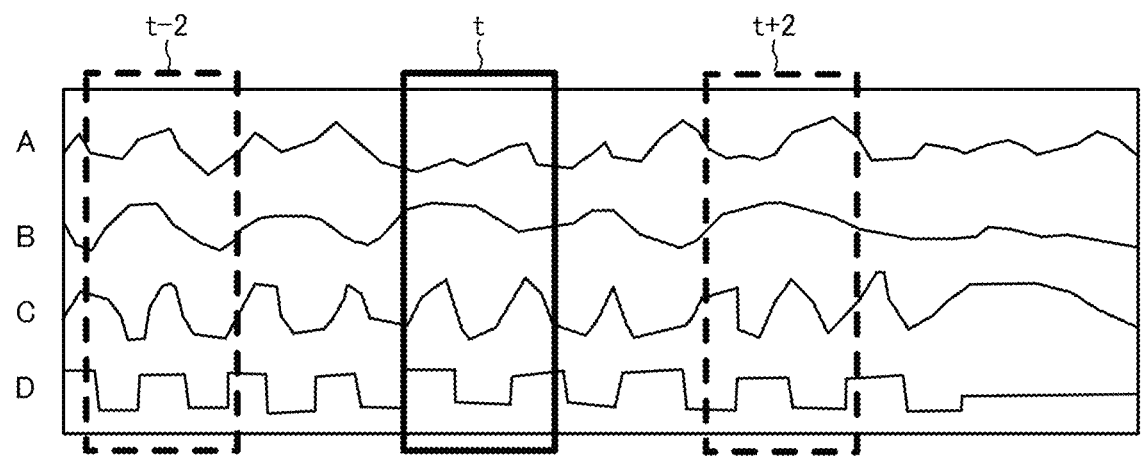
FIG. 7 illustrates how the time-series data is processed by the time-series data processing device disclosed in FIG. 1.
Figure 7:
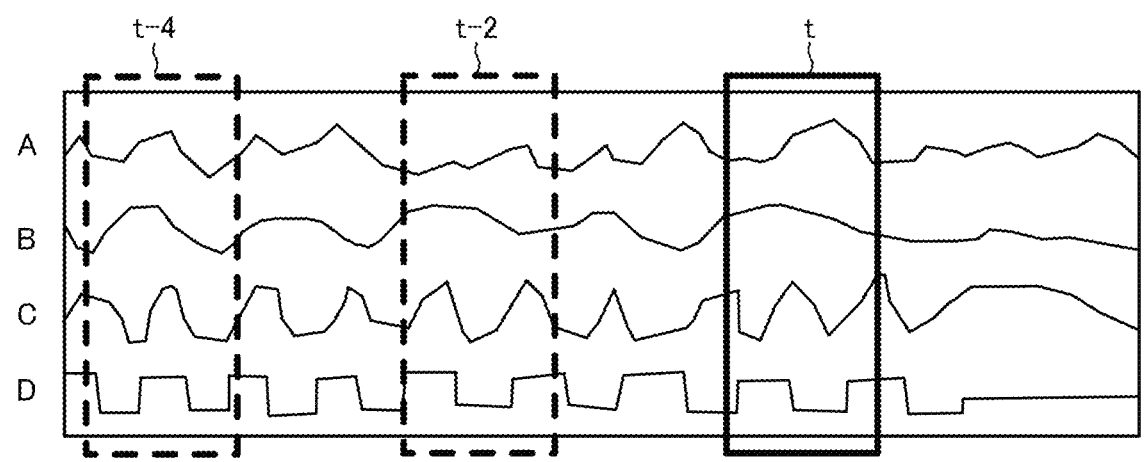

For example, as illustrated in the upper view of FIG. 6, the segment set may be configured of the single target segment at time t and a plurality of neighboring segments (times t−2, t−1, t+1, and t+2) successively adjacently located on each of the prior side and the subsequent side to this target segment on the time axis. Alternatively, for example, as illustrated in the lower view of FIG. 6, the segment set may be configured of the single target segment at time t and a plurality of neighboring segments (times t−2 and t−1) successively adjacently located only prior to this target segment on the time axis. Note that the segment set may be configured of the single target segment at time t and a plurality of neighboring segments successively adjacently located only subsequent to this target segment on the time axis, although this is not illustrated. Alternatively, for example, as illustrated in the upper view of FIG. 7, the segment set may be configured of the single target segment at time t and neighboring segments (times t−2 and t+2) disposed at a predetermined time interval between the segments and located prior and subsequent to the target segment, respectively. Alternatively, for example, as illustrated in the lower view of view of FIG. 7, the segment set may be configured of the single target segment at time t and a plurality of neighboring segments (times t−2 and t−4) disposed at a predetermined time interval between the segments and located only prior to the target segment. Note that the segment set may be configured of the single target segment at time t and a plurality of neighboring segments disposed at a predetermined time interval between the segments and located only subsequent to the target segment, although this is not illustrated. Note that, in the case where the learning unit 12 generates the normal state model of the monitoring object P, the abnormality detection unit 13 detects that the monitoring object P is in the abnormal state if the monitoring object P deviates from the normal state based on the normal state model.

The output unit 14 (the detection unit) outputs the result of the comparison of the feature amounts between the segments, i.e., the result of the abnormality detection and the calculated score to a terminal device (for example, a portable terminal such as a smartphone, a mobile phone, and a tablet) used by a not-illustrated surveillant as described above. For example, when the abnormality is detected by performing the abnormality detection processing in the above-described manner on the abnormality detection time-series data set immediately after the measurement, the output unit 14 may output this detection so as to, for example, transmit information indicating that the abnormality is detected to the terminal device operated by the preset surveillant and/or display information indicating that the abnormality is detected on a monitor set up in a monitoring room.

Further, the output unit 14 may, for example, output a ranking of scores calculated when the abnormality detection processing has been performed on previous abnormality detection time-series data sets as illustrated in FIG. 8. In this case, the output unit 14 may output the time in the abnormality detection time-series data set at which this score has been calculated, the score, and information based on the similarities calculated with respect to the segments in the descending order of the score. For example, the output unit 14 displays boxes corresponding to the positions of the segments in a "similarity map" field, and displays these boxes with the insides thereof filled with respective colors according to the similarities calculated with respect to the corresponding segments. In the example illustrated in FIG. 8, a box corresponding to the target segment is indicated by being surrounded by a solid line at the center of the "similarity map" field, and boxes corresponding to the neighboring segments in the set positional relationship with the target segment are indicated on the both sides thereof. Then, as the similarity calculated with respect to each of the segments increases, the box corresponding to this segment is displayed with the inside thereof filled with a color at a higher density. However, the output unit 14 may output the information based on the similarities calculated with respect to the segments by another method. Further, the output unit 14 may also output a position of a surveillant located closest to the abnormality detected position based on the position where the abnormality has been detected and positional information of terminals held by surveillants. As a result, the time-series data processing device 10 allows the abnormality that has occurred to be dealt with promptly.

[Operation]

Figure 9:
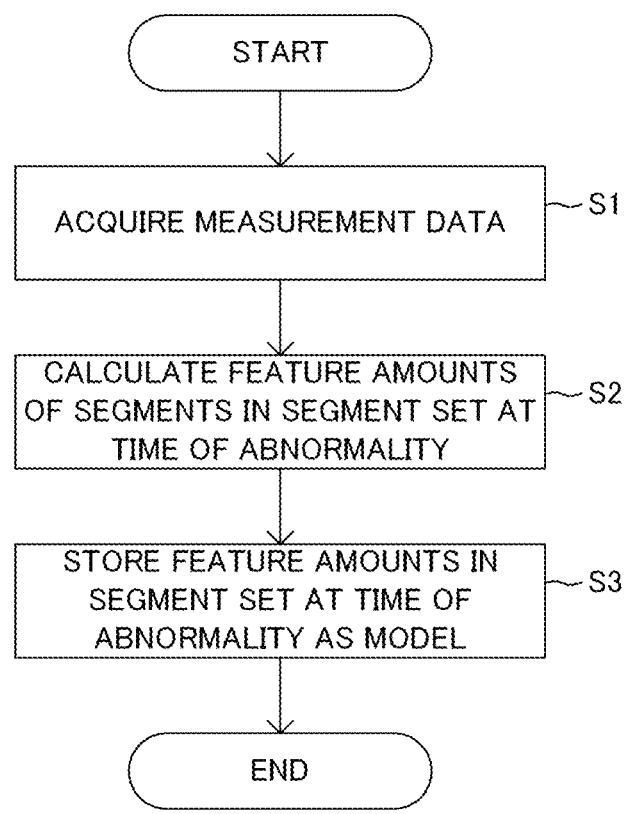
FIG. 9 is a flowchart illustrating an operation of the time-series data processing device disclosed in FIG. 1.
Figure 10:
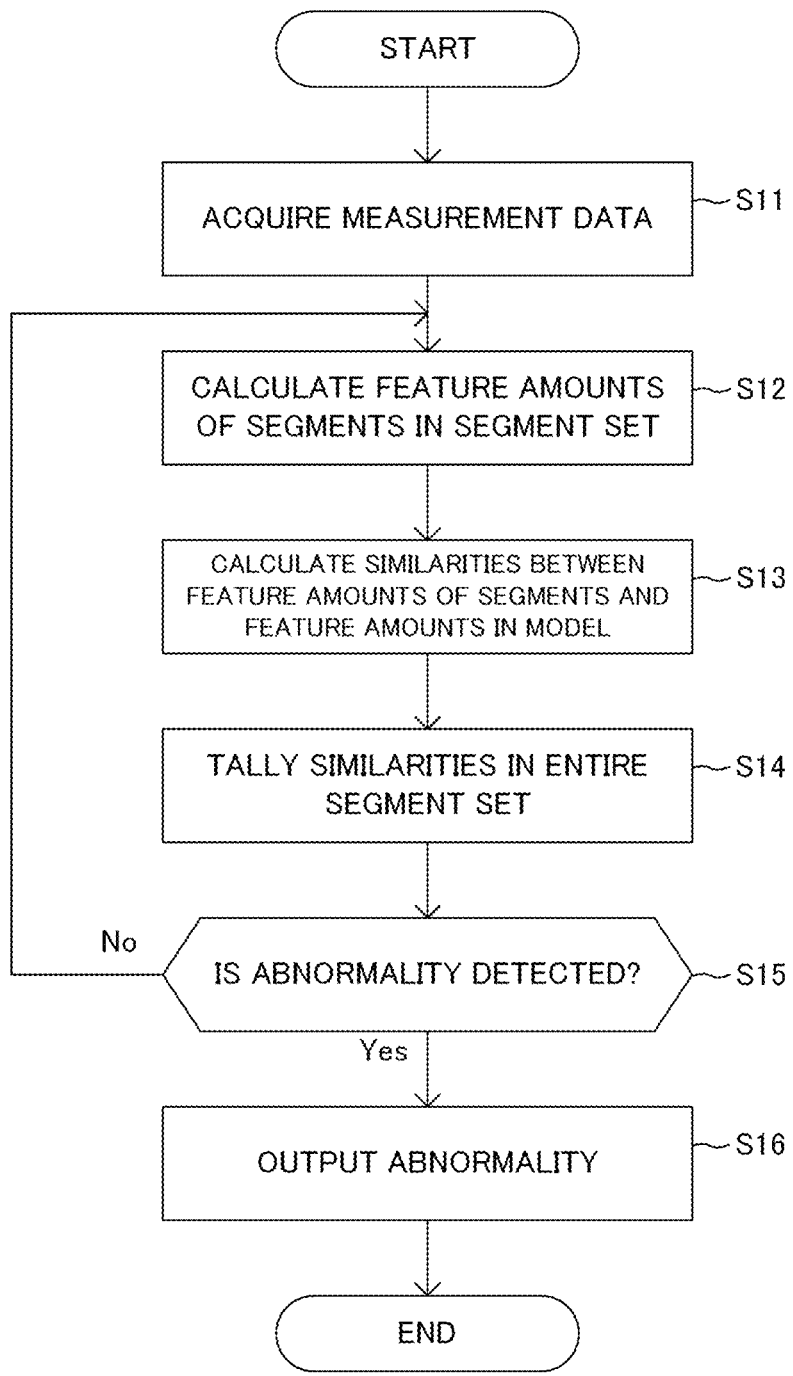
FIG. 10 is a flowchart illustrating an operation of the time-series data processing device disclosed in FIG. 1.

Next, operations of the above-described time-series data processing device 10 will be described mainly with reference to flowcharts of FIGS. 9 and 10. First, an operation when the abnormal state model for detecting the abnormal state of the monitoring object P is generated will be described with reference to the flowchart of FIG. 9.

The time-series data processing device 10 acquires the learning time-series data set measured when the monitoring object P is determined to be in the abnormal state (the first time-series data) among pieces of time-series data already measured from the monitoring object P and stored (step S1). Then, the time-series data processing device 10 extracts the segment set configured of the plurality of segments (the plurality of specific periods) among the segments into which the time-series data set around the time when the specific abnormal state has occurred on the time axis is divided at the predetermined time intervals. For example, as illustrated in FIG. 2, the time-series data processing device 10 extracts the single "target segment" containing time t, and the two "neighboring segments" containing the other times t−1 and t+1 prior and subsequent to the target segment on the time axis, respectively, as the segment set. Then, the time-series data processing device 10 calculates each of the feature amounts $f_t$, $f_{t-1}$, and $f_{t+1}$ of the pieces of partial time-series data included in the segments (step S2).

Then, the time-series data processing device 10 stores the feature amounts of the segments constituting the segment set in association with the information indicating the specific abnormal state as the abnormal state model (step S3). At this time, the time-series data processing device 10 also stores the information indicating the positional relationship among the segments constituting the segment set, i.e., the positional relationship of the neighboring segments with the target segment. Note that the time-series data processing device 10 may extract a segment set in a positional relationship like the examples illustrated in FIGS. 6 and 7 without being limited to extracting the segment set in the positional relationship between the target segment and the neighboring segments like the above-described example illustrated in FIG. 2.

Next, an operation when the abnormal state of the monitoring object P is detected will be described with reference to the flowchart of FIG. 10. The time-series data processing device 10 acquires the measured or stored abnormality detection time-series data set (the second time-series data) of the monitoring object P (step S11). Along therewith, the time-series data processing device 10 reads out the feature amounts of the above-described target segment and neighboring segments as the stored abnormal state model.

Then, the time-series data processing device 10 extracts the comparison segment set configured of the plurality of segments located in correspondence with the positional relationship on the time axis in the segment set configured of the above-described target segment and neighboring segments from the abnormality detection time-series data set. For example, as illustrated in FIG. 3, the time-series data processing device 10 extracts the comparison segment set located in the positional relationship similar to the segment set extracted at the time of the learning in the upper drawing with the center thereof placed at the predetermined time T in the abnormality detection time-series data set in the lower drawing. Then, the time-series data processing device 10 calculates each of the feature amounts in the partial time-series data set in the "comparison target segment" at time T and the "comparison neighboring segments" containing the other times T−1 and T+1 located adjacently prior and subsequent thereto, respectively, which constitute the comparison segment set (step S12).

Subsequently, the time-series data processing device 10 compares the feature amounts of the segments constituting the segment set in the learning time-series data set and the feature amounts of the segments constituting the comparison segment set in the abnormality detection time-series data set for each of the segments. At this time, the time-series data processing device 10 calculates the similarities $S_t$, $S_{t-1}$, and $S_{t+1}$ of the feature amounts between the segments corresponding to each other in the respective positional relationships on the time axis in the time-series data sets as indicated by the arrows in FIG. 3 (step S13).

Subsequently, the time-series data processing device 10 tallies the similarities $S_t$, $S_{t-1}$, and $S_{t+1}$ calculated with respect to the segments as described above (step S14), and determines whether the abnormal state corresponding to the specific state has occurred in the abnormality detection time-series data set (step S15). For example, the time-series data processing device 10 calculates the average value while applying the weights to the similarities $S_t$, $S_{t-1}$, and $S_{t+1}$ according to the positions of the segments, and detects the abnormal state based on the score that is the result of this calculation.

If the abnormality is not detected from the abnormality detection time-series data set (NO in step S15), the time-series data processing device 10 extracts a comparison segment set located at a different time in this time-series data set. Then, similarly to the above-described operation, the time-series data processing device 10 calculates the feature amounts of the segments constituting the comparison segment set (step S12), calculates the similarities with the abnormal state model (steps S13 and S14), and determines whether the abnormal state has occurred (step S15).

If the abnormality is detected in the abnormality detection time-series data set based on the tallied score (YES in step S15), the time-series data processing device 10 outputs the detection of the abnormality (step S16). For example, the time-series data processing device 10 outputs this detection so as to, for example, transmit the information indicating that the abnormality is detected to the e-mail address of the preset surveillant and/or display the information indicating that the abnormality is detected on the monitor set up in the monitoring room. Note that the time-series data processing device 10 may output the tallying results of the abnormality detection conducted so far in the form of the ranking as illustrated in FIG. 8.

In this manner, in the present exemplary embodiment, the time-series data processing device 10 detects the specific state such as the abnormality in the abnormality detection time-series data using the feature amounts of the pieces of partial time-series data in the plurality of segments (periods) in the time-series data measured from the monitoring object P. The time-series data processing device 10 detects the specific state using the feature amounts of the plurality of segments as a set in this manner, thereby being able to prevent or reduce detection of matches with a large number of pieces of partial time-series data even when the length of the duration of the segment is set to a short length, and thus being able to appropriately detect the specific situation such as the abnormality from the time-series data.

Second Exemplary Embodiment

Figure 11:
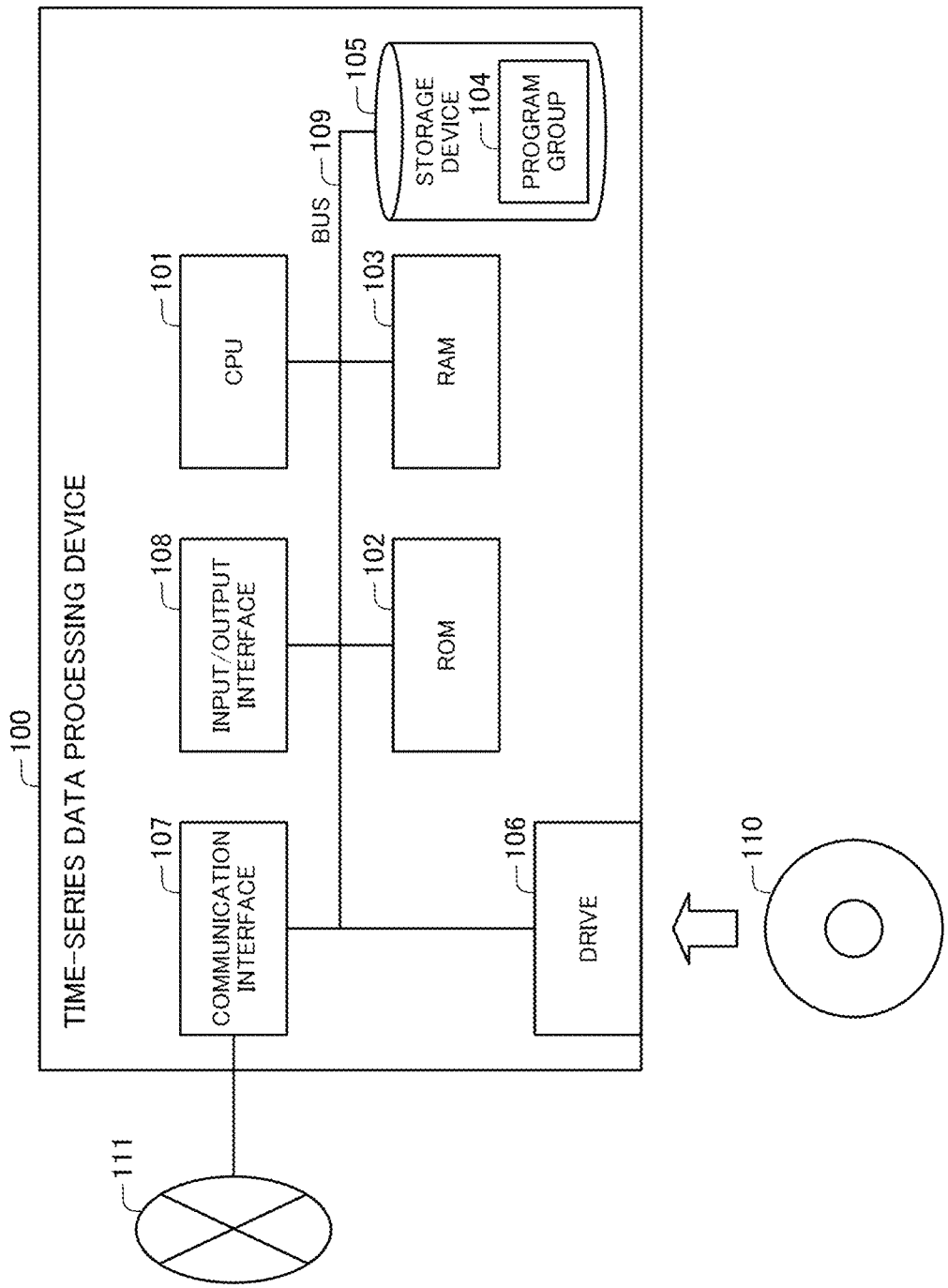
FIG. 11 is a block diagram illustrating a hardware configuration of a time-series data processing device according to a second exemplary embodiment of the present invention.
Figure 12:
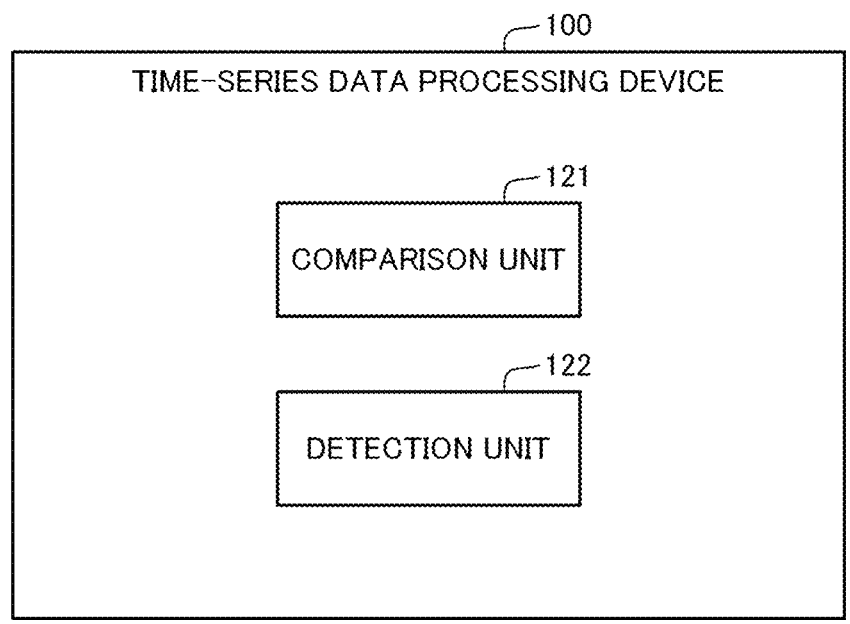
FIG. 12 is a block diagram illustrating a configuration of the time-series data processing device according to the second exemplary embodiment of the present invention.
Figure 13:
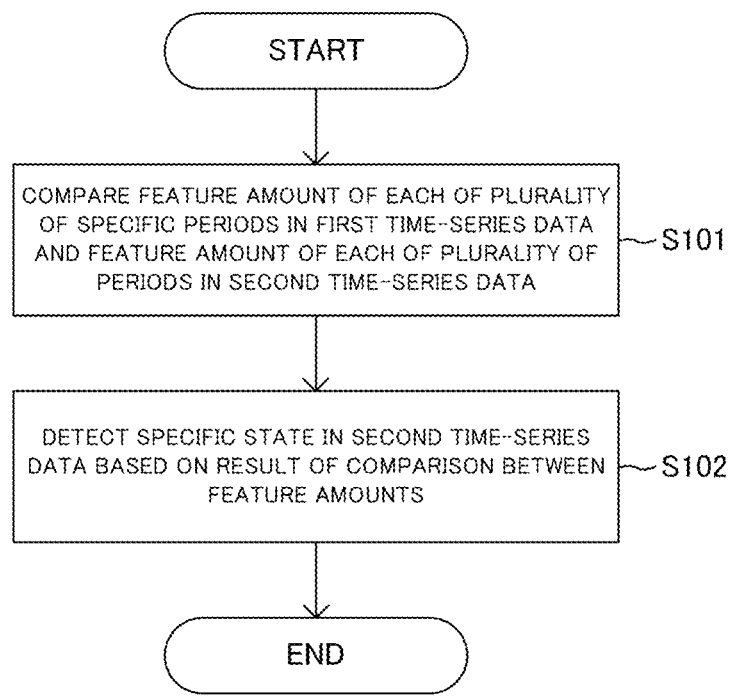
FIG. 13 is a flowchart illustrating an operation of the time-series data processing device according to the second exemplary embodiment of the present invention.

Next, a second exemplary embodiment of the present invention will be described with reference to FIGS. 11 to 13. FIGS. 11 and 12 are block diagrams illustrating a configuration of a time-series data processing device of the second exemplary embodiment, and FIG. 13 is a flowchart illustrating an operation of the time-series data processing device. Note that the present embodiment indicates the outlines of the time-series data processing device and the time-series data processing method described in the above-described exemplary embodiment.

First, a hardware configuration of a time-series data processing device 100 in the present embodiment will be described with reference to FIG. 11. The time-series data processing device 100 is configured of a typical information processing device, having a hardware configuration as described below as an example.

Central Processing Unit (CPU) 101 (arithmetic unit)
Read Only Memory (ROM) 102 (storage unit)
Random Access Memory (RAM) 103 (storage unit)
Program group 104 to be loaded to the RAM 103
Storage device 105 storing therein the program group 104
Drive 106 that performs reading and writing on a storage medium 110 outside the information processing device
Communication interface 107 connecting to a communication network 111 outside the information processing device
Input/output interface 108 for performing input/output of data
Bus 109 connecting the constituent elements Then, the time-series data processing device 100 can construct and be equipped with a comparison unit 121 and a detection unit 122 illustrated in FIG. 12 through acquisition of the program group 104 and execution thereof by the CPU 101. Note that the program group 104 is, for example, stored in the storage device 105 or the ROM 102 in advance, and is loaded to the RAM 103 by the CPU 101 as needed. Further, the program group 104 may be provided to the CPU 101 via the communication network 111, or may be stored on the storage medium 110 in advance and read out by the drive 106 and supplied to the CPU 101. However, the above-described comparison unit 121 and detection unit 122 may be constructed by electronic circuits designed specifically for realizing these units.

Note that FIG. 11 illustrates an example of the hardware configuration of the information processing device that is the time-series data processing device 100. The hardware configuration of the information processing device is not limited to that described above. For example, the information processing device may be configured of a part of the configuration described above, such as without the drive 106.

Then, the time-series data processing device 100 executes the time-series data processing method illustrated in the flowchart of FIG. 13 by the functions of the comparison unit 121 and the detection unit 122 constructed by the program as described above.

As illustrated in FIG. 13, the time-series data processing device 100 performs processing of comparing a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data (step S101), and detecting a specific state in the second time-series data based on a result of the comparison (step S102).

With the configurations described above, in the present invention, the specific state such as the abnormality in the abnormality detection time-series data is detected using the feature amounts of the pieces of partial time-series data in the plurality of periods in the time-series data. The specific state is detected using the feature amounts in the plurality of periods as a set in this manner, which makes it possible to prevent or reduce detection of matches with a large number of pieces of partial time-series data even when the length of the duration of the period is set to a short length, thereby making it possible to appropriately detect the specific situation such as the abnormality in the time-series data.

Note that the program described above can be supplied to a computer by being stored on a non-transitory computer readable medium of any type. Non-transitory computer readable media include tangible storage media of various types. Examples of non-transitory computer readable media include a magnetic recording medium (for example, a flexible disk, a magnetic tape, and a hard disk drive), a magneto-optical recording medium (for example, a magneto-optical disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM (Random Access Memory)). The program described above may also be supplied to a computer by being stored on a transitory computer readable medium of any type. Examples of transitory computer readable media include electric signals, optical signals, and electromagnetic waves. A transitory computer readable medium can supply the program to a computer via a wired communication channel such as an electric wire and an optical fiber, or a wireless communication channel.

While the present invention has been described with reference to the exemplary embodiments described above, the present invention is not limited to the above-described embodiments. The form and details of the present invention can be changed within the scope of the present invention in various manners that can be understood by those skilled in the art. Further, at least one or more function(s) of the above-described comparison unit 121 and detection unit 122 may be executed by an information processing apparatus set up at any location in a network and connected therefrom, i.e., may be executed by so-called cloud computing.

<Supplementary Notes>

The whole or part of the exemplary embodiments disclosed above can be described as, but not limited to, the following supplementary notes. Hereinafter, outlines of the configurations of a time-series data processing method, a time-series data processing device, a time-series data processing system, and a program, according to the present invention, will be described. However, the present invention is not limited to the configurations described below.

(Supplementary Note 1)

A time-series data processing method comprising:
  comparing a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data; and
  detecting a specific state in the second time-series data based on a result of the comparing.

(Supplementary Note 2)

The time-series data processing method according to supplementary note 1, further comprising:
  comparing the feature amounts of the pieces of partial time-series data between periods corresponding to each other in the positional relationships on the time axis among the plurality of specific periods in the first time-series data and among the plurality of periods in the second time-series data for each of the periods.

(Supplementary Note 3)

The time-series data processing method according to supplementary note 1 or 2, wherein
  the plurality of specific periods is configured of a single target period and at least one other period located at a specific position that is a preset position on the time axis relative to this target period in the first time-series data,
  the time-series data processing method further comprising:
  comparing the feature amount of the partial time-series data in the target period in the first time-series data and the feature amount of the partial time-series data in the predetermined period in the second time-series data, and also comparing the feature amount of the partial time-series data in the at least one other period in the first time-series data and the feature amount of the partial time-series data in at least one period located at the specific position relative to the predetermined period in the second time-series data.

(Supplementary Note 4)

The time-series data processing method according to supplementary note 3, wherein the specific position indicates a position prior and/or subsequent to the target period on the time axis.

(Supplementary Note 5)

The time-series data processing method according to supplementary note 3 or 4, wherein
  the specific position indicates a position within a preset range on the time axis from the target period.

(Supplementary Note 6)

The time-series data processing method according to any of supplementary notes 3 to 5, wherein
  the specific position indicates a position adjacent to the target period on the time axis.

(Supplementary Note 7)

The time-series data processing method according to any of supplementary notes 3 to 6, wherein
  the specific position indicates a plurality of positions successively adjacent to the target period on the time axis.

(Supplementary Note 8)

The time-series data processing method according to any of supplementary notes 1 to 7, further comprising:
  calculating a similarity between the feature amounts compared for each of the periods; and
  detecting the specific state in the second time-series data based on all of the calculated similarities.

(Supplementary Note 9)

The time-series data processing method according to any of supplementary notes 3 to 7, further comprising:
  calculating a similarity between the feature amounts compared with respect to the target period and a similarity between the feature amounts compared with respect to the other period; and
  tallying the similarity with respect to the target period and the similarity with respect to the other period by different methods and detecting the specific state in the second time-series data based on a result of the tallying.

(Supplementary Note 10)

The time-series data processing method according to supplementary note 9, further comprising:
  tallying the similarities while applying a lower weight to the similarity with respect to the other period than the similarity with respect to the target period.

(Supplementary Note 11)

The time-series data processing method according to any of supplementary notes 1 to 10, further comprising:
  outputting the result of comparing the feature amounts for each of the periods.

(Supplementary Note 12)

A time-series data processing device comprising:
  a comparison unit configured to compare a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data; and
  a detection unit configured to detect a specific state in the second time-series data based on a result of the comparison.

(Supplementary Note 13)

The time-series data processing device according to supplementary note 12, wherein the comparison unit compares the feature amounts of the pieces of partial time-series data between periods corresponding to each other in the positional relationships on the time axis among the plurality of specific periods in the first time-series data and among the plurality of periods in the second time-series data for each of the periods.

(Supplementary Note 14)

The time-series data processing device according to supplementary note 12 or 13, wherein the plurality of specific periods is configured of a single target period and at least one other period located at a specific position that is a preset position on the time axis relative to this target period in the first time-series data, and the comparison unit compares the feature amount of the partial time-series data in the target period in the first time-series data and the feature amount of the partial time-series data in the predetermined period in the second time-series data, and also compares the feature amount of the partial time-series data in the at least one other period in the first time-series data and the feature amount of the partial time-series data in at least one period located at the specific position relative to the predetermined period in the second time-series data.

(Supplementary Note 14.1)

The time-series data processing method according to supplementary note 14, wherein the specific position indicates a position prior and/or subsequent to the target period on the time axis.

(Supplementary Note 14.2)

The time-series data processing method according to supplementary note 14 or 14.1, wherein the specific position indicates a position within a preset range on the time axis from the target period.

(Supplementary Note 14.3)

The time-series data processing method according to any of supplementary notes 14 to 14.2, wherein the specific position indicates a position adjacent to the target period on the time axis.

(Supplementary Note 14.4)

The time-series data processing method according to any of supplementary notes 14 to 14.3, wherein the specific position indicates a plurality of positions successively adjacent to the target period on the time axis.

(Supplementary Note 15)

The time-series data processing device according to any of supplementary notes 12 to 14, wherein the comparison unit calculates a similarity between the feature amounts compared for each of the periods, and the detection unit detects the specific state in the second time-series data based on all of the calculated similarities.

(Supplementary Note 16)

The time-series data processing device according to supplementary note 14, wherein the comparison unit calculates a similarity between the feature amounts compared with respect to the target period and a similarity between the feature amounts compared with respect to the other period, and the detection unit tallies the similarity with respect to the target period and the similarity with respect to the other period by different methods and detects the specific state in the second time-series data based on a result of the tallying.

(Supplementary Note 17)

The time-series data processing device according to supplementary note 16, wherein the detection unit tallies the similarities while applying a lower weight to the similarity with respect to the other period than the similarity with respect to the target period.

(Supplementary Note 18)

The time-series data processing device according to any of supplementary notes 12 to 17, wherein the detection unit outputs the result of comparing the feature amounts for each of the periods.

(Supplementary Note 19)

A program causing an information processing device to realize:

a comparison unit configured to compare a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data; and a detection unit configured to detect a specific state in the second time-series data based on a result of the comparison.

(Supplementary Note 20)

A time-series data processing system comprising:

a comparison unit configured to compare a feature amount of each of pieces of partial time-series data in a plurality of specific periods at different positions on a time axis in first time-series data and a feature amount of each of pieces of partial time-series data in a plurality of periods located in correspondence with a positional relationship among the plurality of specific periods in second time-series data; and a detection unit configured to detect a specific state in the second time-series data based on a result of the comparison.

REFERENCE SIGNS LIST 10 time-series data processing device
11 measurement unit
12 learning unit
13 abnormality detection unit
14 output unit
16 measurement data storage unit
17 learning data storage unit
18 detection data storage unit
100 time-series data processing device
101 CPU
102 ROM
103 RAM
104 program group
105 storage device
106 drive
107 communication interface
108 input/output interface
109 bus
110 storage medium
111 communication network
121 comparison unit
122 detection unit

What is claimed is:

1. A time-series data processing method performed by a computer and comprising:

receiving, from a sensor, first time-series data regarding a monitoring object measured by the sensor in a plurality of first periods, the first time-series data including a plurality of first pieces of partial-time series data, wherein the monitoring object is operating in an abnormal state in the first periods;

learning a model that predicts whether the monitoring object is operating in the abnormal state, by respectively extracting first feature amounts from the first pieces of partial time-series data, wherein the extracted first feature amounts constitute the learned model;

storing the learned model that is constituted by the extracted first feature amounts;

receiving, from the sensor, second time-series data measured by the sensor in a plurality of second periods respectively corresponding to the plurality of first periods in position relationship on a time axis, the second time-series data including a plurality of second pieces of partial-time series data, wherein whether the monitoring object is operating in the abnormal state in the first periods is not known;

respectively extracting second feature amounts from the second pieces of time-series data;

respectively comparing the extracted first feature amounts of the first pieces of partial time-series data in the first periods, which constitute the learned model, with the second feature amounts of the extracted second pieces of partial time-series data, to determine similarities between the extracted first feature amounts and the extracted second feature amounts;

calculating similarities between the first feature amounts and the second feature amounts compared with respect to a target period and similarities between the first feature amounts and the second feature amounts compared with respect to at least one other period;

tallying the similarities with respect to the target period and the similarities with respect to the at least one other period by different methods;

detecting whether the monitoring object is in the abnormal state based on a result of the tallying; and outputting a result of comparison of the first feature amounts with the second feature amounts.

2. The time-series data processing method according to claim 1, wherein
the plurality of first periods is configured of the target period and the at least one other period, which is located at a specific position that is a preset position on the time axis relative to the target period in the first time-series data, and
the time-series data processing method further comprises:
comparing the first feature amounts of the first pieces of partial time-series data in the target period and the second feature amounts of the second pieces of partial time-series data in a corresponding period in the second time-series data; and
comparing the first feature amounts of the first pieces of partial time-series data in the at least one other period in the first time-series data and the second feature amounts of the second pieces of partial time-series data in at least one period located at the specific position relative to the corresponding period in the second time-series data.

3. The time-series data processing method according to claim 2, wherein
the specific position indicates a position prior and/or subsequent to the target period on the time axis.

4. The time-series data processing method according to claim 2, wherein
the specific position indicates a position within a preset range on the time axis from the target period.

5. The time-series data processing method according to claim 2, wherein
the specific position indicates a position adjacent to the target period on the time axis.

6. The time-series data processing method according to claim 2, wherein
the specific position indicates a plurality of positions successively adjacent to the target period on the time axis.

7. The time-series data processing method according to claim 1, further comprising:
tallying the similarities while applying a lower weight to the similarities with respect to the at least one other period than to the similarities with respect to the target period.

8. A time-series data processing device comprising:
at least one memory storing instructions; and
at least one processor configured to execute instructions to:
receive, from a sensor, first time-series data regarding a monitoring object measured by the sensor in a plurality of first periods, the first time-series data including a plurality of first pieces of partial-time series data, wherein the monitoring object is operating in an abnormal state in the first periods;
learn a model that predicts whether the monitoring object is operating in the abnormal state, by respectively extracting first feature amounts from the first pieces of partial time-series data, wherein the extracted first feature amounts constitute the learned model;
store the learned model that is constituted by the extracted first feature amounts;
receive, from the sensor, second time-series data measured by the sensor in a plurality of second periods respectively corresponding to the plurality of first periods in position relationship on a time axis, the second time-series data including a plurality of second pieces of partial-time series data, wherein whether the monitoring object is operating in the abnormal state in the first periods is not known;
respectively extract second feature amounts from the second pieces of time-series data;
respectively compare the extracted first feature amounts of the first pieces of partial time-series data in the first periods, which constitute the learned model, with the second feature amounts of the extracted second pieces of partial time-series data, to determine similarities between the extracted first feature amounts and the extracted second feature amounts;
calculate similarities between the first feature amounts and the second feature amounts compared with respect to a target period and similarities between the first feature amounts and the second feature amounts compared with respect to at least one other period;
tally the similarities with respect to the target period and the similarities with respect to the at least one other period by different methods;
detect whether the monitoring object is in the abnormal state based on; and
output a result of comparison of the first feature amounts with the second feature amounts.

9. The time-series data processing device according to claim 8, wherein
the plurality of first periods is configured of the target period and the at least one other period located at a specific position that is a preset position on the time axis relative to the target period in the first time-series data, and the at least one processor is configured to execute the instructions to:

compare the first feature amounts of the first pieces of partial time-series data in the target period and the second feature amounts of the second pieces of partial time-series data in a corresponding period in the second time-series data; and compare the first feature amounts of the first pieces of partial time-series data in the at least one other period in the first time-series data and the second feature amounts of the second pieces of partial time-series data in at least one period located at the specific position relative to the corresponding period in the second time-series data.

10. The time-series data processing device according to claim 8, wherein the at least one processor is configured to execute the instructions to:

tally the similarities while applying a lower weight to the similarities with respect to the at least one other period than to the similarities with respect to the target period.

11. A non-transitory computer-readable storage medium storing a program executable by an information processing device to perform processing comprising:

receiving, from a sensor, first time-series data regarding a monitoring object measured by the sensor in a plurality of first periods, the first time-series data including a plurality of first pieces of partial-time series data, wherein the monitoring object is operating in an abnormal state in the first periods;

learning a model that predicts whether the monitoring object is operating in the abnormal state, by respectively extracting first feature amounts from the first pieces of partial time-series data, wherein the extracted first feature amounts constitute the learned model;

storing the learned model that is constituted by the extracted first feature amounts;

receiving, from the sensor, second time-series data measured by the sensor in a plurality of second periods respectively corresponding to the plurality of first periods in position relationship on a time axis, the second time-series data including a plurality of second pieces of partial-time series data, wherein whether the monitoring object is operating in the abnormal state in the first periods is not known;

respectively extracting second feature amounts from the second pieces of time-series data;

respectively comparing the extracted first feature amounts of the first pieces of partial time-series data in the first periods, which constitute the learned model, with the second feature amounts of the extracted second pieces of partial time-series data, to determine similarities between the extracted first feature amounts and the extracted second feature amounts;

calculating similarities between the first feature amounts and the second feature amounts compared with respect to a target period and similarities between the first feature amounts and the second feature amounts compared with respect to at least one other period;

tallying the similarities with respect to the target period and the similarities with respect to the at least one other period by different methods;

detecting whether the monitoring object is in the abnormal state based on a result of the tallying; and outputting a result of comparison of the first feature amounts with the second feature amounts.

* * * * *